United States Patent
Chennaoui et al.

(10) Patent No.: US 12,258,132 B1
(45) Date of Patent: Mar. 25, 2025

(54) AIRCRAFT SEAT FRAME

(71) Applicants: Abdelilah Chennaoui, Denton, TX (US); Aamir Jafri, Leonardtown, MD (US)

(72) Inventors: Abdelilah Chennaoui, Denton, TX (US); Aamir Jafri, Leonardtown, MD (US)

( * ) Notice: Subject to any disclaimer, the term of this patent is extended or adjusted under 35 U.S.C. 154(b) by 0 days.

(21) Appl. No.: 18/891,145

(22) Filed: Sep. 20, 2024

(51) Int. Cl.
*B64D 11/06* (2006.01)

(52) U.S. Cl.
CPC ................. *B64D 11/0648* (2014.12)

(58) Field of Classification Search
CPC .......... B64D 11/0648; B64D 11/0649
See application file for complete search history.

(56) References Cited

U.S. PATENT DOCUMENTS

| | | | | |
|---|---|---|---|---|
| 6,170,786 B1 * | 1/2001 | Park | ................ | B64D 11/0606 248/274.1 |
| 6,669,143 B1 * | 12/2003 | Johnson | ............. | B64D 11/0638 244/118.6 |
| 6,824,213 B2 * | 11/2004 | Skelly | ................... | B64D 11/06 297/217.3 |
| D505,796 S * | 6/2005 | Johnson | ........................ | D6/356 |
| 2004/0099766 A1 * | 5/2004 | Pratt, Jr. | ............ | B64D 11/0649 244/118.6 |
| 2008/0290715 A1 * | 11/2008 | Fullerton | ........... | B64D 11/0649 297/452.18 |

* cited by examiner

*Primary Examiner* — Justin M Benedik
(74) *Attorney, Agent, or Firm* — Plager Schack LLP; Mark H. Plager, Esq.; Kara Verryt, Esq.

(57) ABSTRACT

An aircraft seat frame for supporting at least one human individual may include a contiguous plate having a first end and a second end; a first bend in the contiguous plate, the first bend spaced from the first end, thus defining a back support portion extending between the first end and the first bend; a second bend in the contiguous plate, the second bend spaced from the first bend, thus defining a seat portion extending between the first bend and the second bend; and a third bend in the contiguous plate, the third bend spaced from the second bend and from the second end, thus defining a leg portion extending between the second bend and the third bend and a base extending from the third bend to the second end.

9 Claims, 3 Drawing Sheets

AIRCRAFT SEAT FRAME

BACKGROUND

The embodiments described herein relate generally to seat frames and, more particularly, to an updated aircraft seat frame.

Conventional aircraft seat frames incur a high cost to manufacture. Additionally, because of the number of parts used to make conventional aircraft seats, manufacturing is complex due to the design and the design is difficult to certify. Because conventional designs also allow for reclining of the seats, use of the seat can encroach on the personal space of the passenger sitting behind the reclining passenger.

Therefore, what is needed is a universal aircraft seat frame requiring fewer parts, decreasing the complexity of manufacturing and the overall weight of the frame as comparted to conventional aircraft seats.

SUMMARY

Some embodiments of the present disclosure include an aircraft seat frame for supporting at least one human individual. The frame may include a contiguous plate having a first end and a second end; a first bend in the contiguous plate, the first bend spaced from the first end, thus defining a back support portion extending between the first end and the first bend; a second bend in the contiguous plate, the second bend spaced from the first bend, thus defining a seat portion extending between the first bend and the second bend; and a third bend in the contiguous plate, the third bend spaced from the second bend and from the second end, thus defining a leg portion extending between the second bend and the third bend and a base extending from the third bend to the second end.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a seat frame for an aircraft seat and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIG. 1-5, some embodiments of the present disclosure include an aircraft seat frame 10 comprising a contiguous rigid body with strategically positioned bends, creating the frame 10. More specifically, the seat frame 10 comprises a contiguous rigid plate 12 having a first end and a second end; a first bend 20A spaced from the first end, thus defining a back support portion 16A extending between the first end and the first bend 20A; a second bend 20B spaced from the first bend 20A, thus defining a seat portion 14 extending between the first bend 20A and the second bend 20B; and a third bend 20C spaced from the second bend 20B and from the second end, thus defining a leg portion 21A extending between the second bend 20B and the third bend 20C and a base 18B extending from the third bend 20C to the second end, wherein the frame 10 is sized to support a human individual or multiple human individuals.

As shown in the Figures, the first bend 20A may result in the back support 16A extending upward from the seat portion 14 at an angle of roughly 90 to 100 degrees. The second bend 20B may be about 90 degrees, such that the leg portion 21A extends substantially perpendicularly downward from the seat portion 14 and, thus, away from the back support 16A. The third bend 20C may also be about 90 degrees, such that the base 18B extends substantially perpendicularly from the leg portion 21A, wherein the base 18B and the seat portion 14 may be substantially parallel. As shown in the Figures, each of the bends 20A, 20B, 20C may be rounded, thus preventing or reducing the risk of injury to a user.

Figure 1:
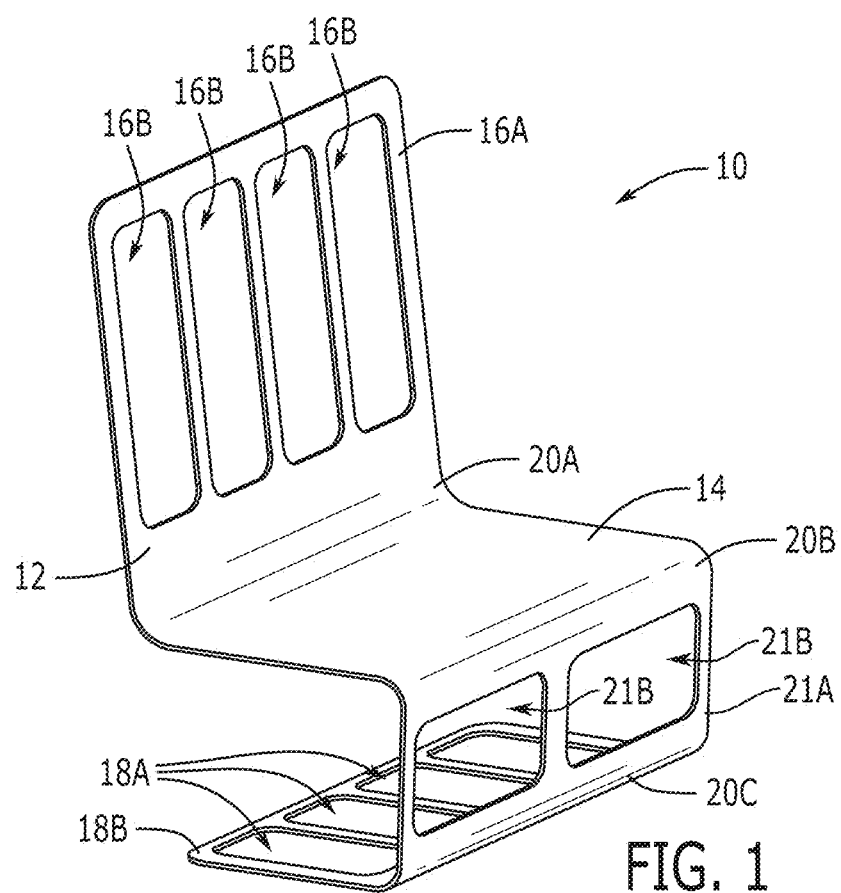
FIG. 1 is a front perspective view of one embodiment of the present disclosure.

In embodiments, each of the back support 16A, the leg portion 21A, and the base 18B may have orifices extending therethrough. For example, and as shown in FIG. 1, the back support 16A may have a plurality of back support orifices 16B extending therethrough. In some embodiments, the back support orifices 16B may be substantially rectangular. A particular embodiment of the frame 10 may include four back support orifices 16B extending through the back support 16A. The leg portion 21A may also have a plurality of leg orifices 21B extending therethrough, wherein the leg orifices 21B may be, for example, substantially rectangular in shape. In a particular embodiment, the leg portion 21A may have two leg orifices 21B extending therethrough. The base 18B may also have a plurality of base orifices 18A extending therethrough. The base orifices 18A may be substantially rectangular. In a particular embodiment, the base 18B may have four rectangular base orifices 18A extending therethrough.

Figure 2:
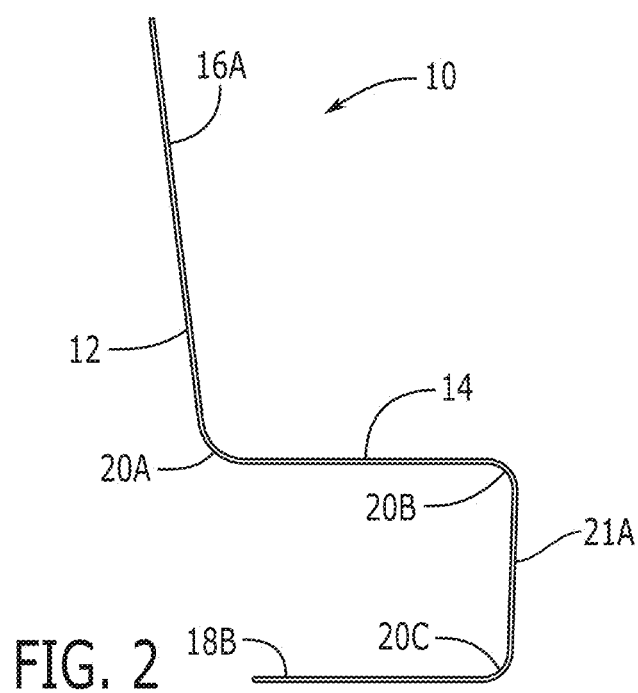
FIG. 2 is a side elevation of one embodiment of the present disclosure.
Figure 3:
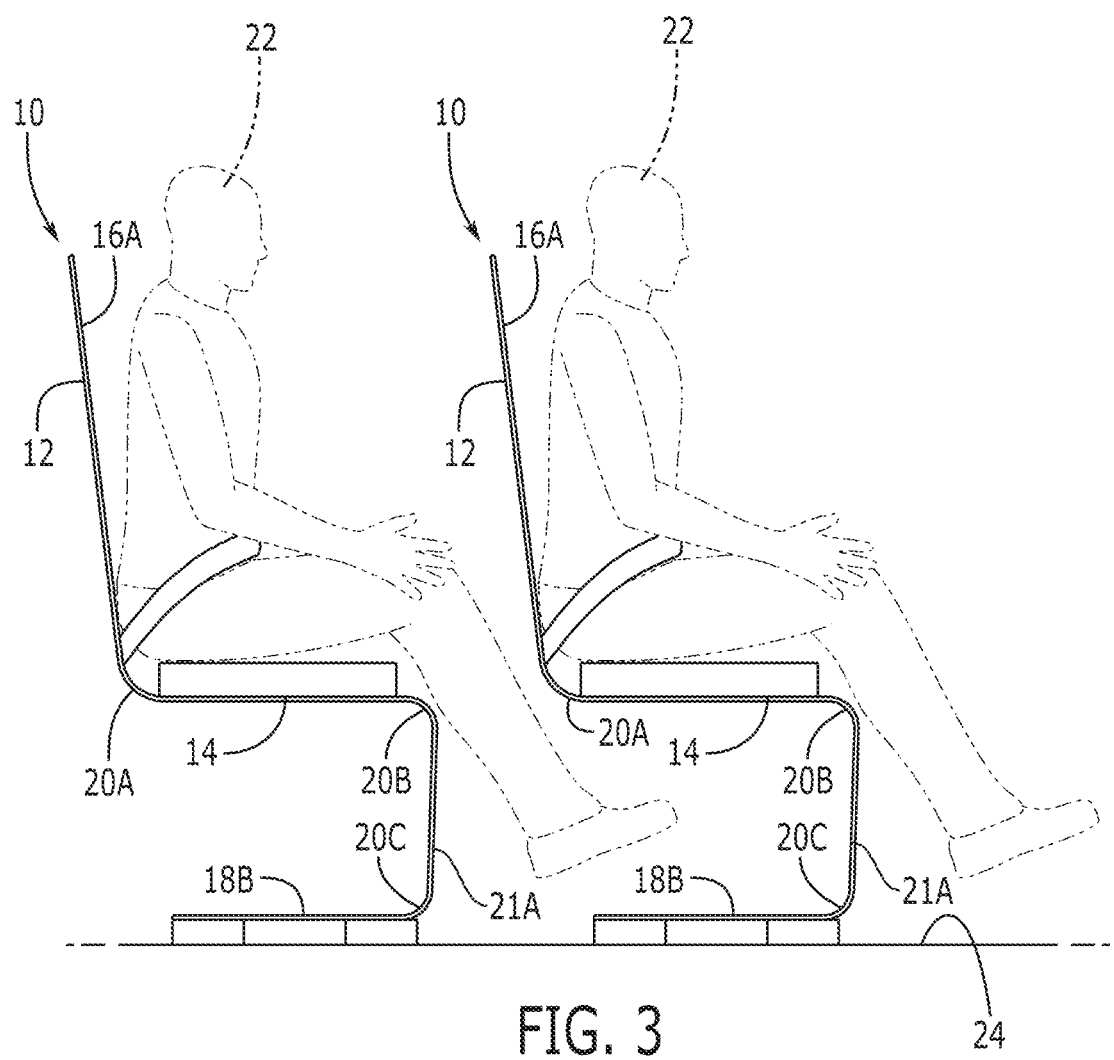
FIG. 3 is a side elevation view of one embodiment of the present disclosure, shown in use.
Figure 4:
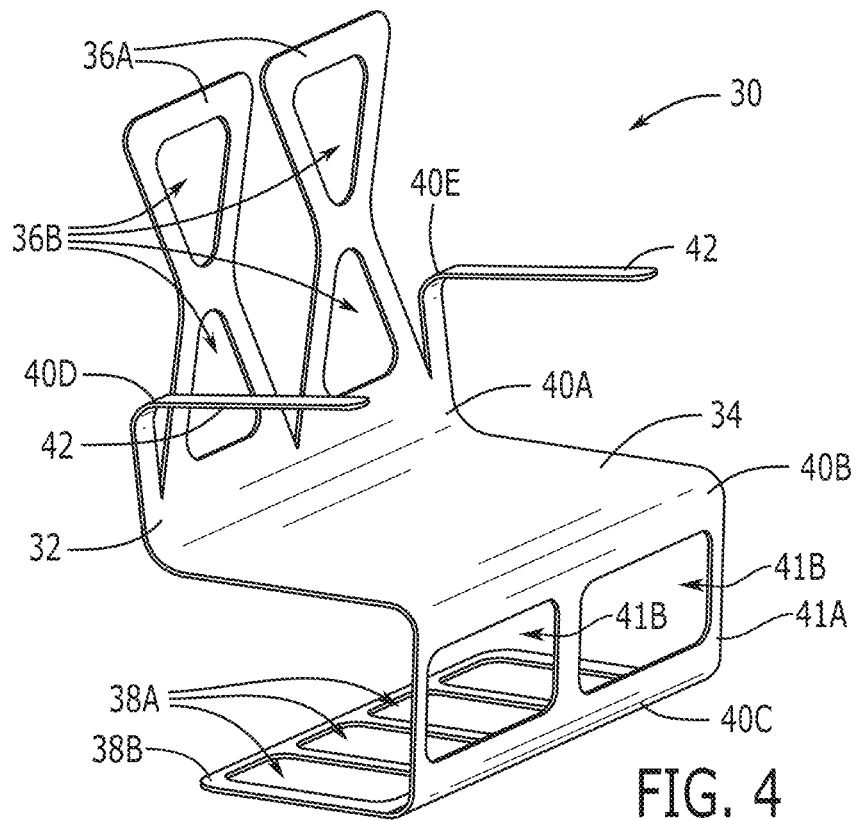
FIG. 4 is a perspective view of one embodiment of the present disclosure.
Figure 5:
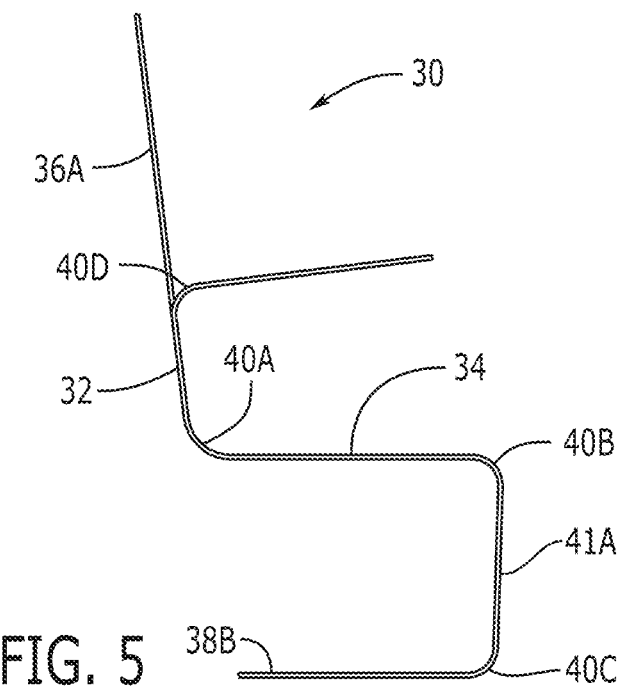
FIG. 5 is a side elevation view of one embodiment of the present disclosure.

While a first version of the frame 10 is shown in FIGS. 1-3, embodiments of the frame may vary without impacting the overall functionality of the frame. For example, as shown in FIGS. 4 and 5, the shape and number of orifices in each of the back support, leg portion, and base may vary. In other embodiments, outer edges of the back support may have a vertical slit cut therein, providing for the creation of arm rests 42. More specifically, a first arm rest 42 may be provided by creating a fourth bend 40D and a second arm rest 42 may be provided by creating a fifth bend 40E in the sides of the back support. While not shown in the Figures, embodiments of the frame may further comprise a leg recline support operatively mounted within the leg orifices, the leg recline support configured to extend at various angles outward from the leg portion to provide a leg support for users In a particular alternate embodiment, the alternate frame 30 may comprise a contiguous rigid plate 32 having a first end and a second end; a first bend 40A spaced from the first end, thus defining a back support portion 36A extending between the first end and the first bend 40A; a second bend 40B spaced from the first bend 40A, thus defining a seat portion 34 extending between the first bend 40A and the second bend 40B; and a third bend 40C spaced from the second bend 40B and from the second end, thus defining a leg portion 41A extending between the second bend 40B and the third bend 40C and a base 38B extending from the third bend 40C to the second end. As shown in the Figures, the back support 36A may comprise a plurality of, such as a pair of, hour glass shaped panels with a plurality of back support orifices 36B, such as triangular orifices, extending therethrough. Outer edges of the back support 36A may be bent to form a pair of armrests 42. While not shown in the Figures, armrests 42 may also extend downward from interior portions of the back support, such that a plurality of passengers have an armrest 42 for each arm when sitting on the frame. The leg portion 41A may comprise a plurality of leg orifices 41B extending therethrough, and the base 38B may comprise a plurality of base orifices 38A extending therethrough.

While two specific examples of the frame are shown in the Figures, other versions having variously shaped and sized orifices are envisioned.

While not shown in the Figures, in embodiments, exterior attachments, such as cushions and material covers to increase comfort, may be operatively attached to various portions of the frame. Seatbelts may also be operatively attached to the frame to provide a mechanism for securing the users to the frame. In other embodiments, a sliding pan may be operatively attached to a front surface of the back support and a top surface of the seat, wherein the sliding pan may comprise a back panel hingeably attached to a seat panel, the back panel configured to slide up and down along the height of the back support and the seat panel configured to slide front and back along the depth of the seat to provide a recline-like support for a user's back.

To manufacture the frame of the present disclosure, a sheet of a rigid material, such as metal, such as aluminum, may be bent at the three bend areas to create a basic bench shape. When desired the additional bends may be made to the back support to create arm rests. The various orifices may be stamped or otherwise cut from the material. When desired, the optional features, such as cushions, the sliding pan, and the like, may be operatively attached to the frame. In some embodiments, the surface of the frame may be treated with a composition to help prevent viruses from sticking thereto and for making the frame easier to clean.

While not particularly limited in dimensions, the sheet may have a size of, for example, about 4 to 6 feet by about 8 to 10 feet. The material may have a thickness of, for example, about ¼ inch. However, the dimensions, and particularly the width, may vary depending on how many individuals the particular frame is intended to support.

To use the seat frame of the present disclosure, the frame may be easily mounted to aircraft tracks using, for example, studs. Passengers may then simply sit on the seat portion and secure themselves thereto using a standard seatbelt that is operatively attached to the frame.

While described above as being a frame useful for aircraft seating, the frame of the present disclosure is not limited to such use. It is understood that the frame could be used for seating in any location, any vehicle, any building, etc.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. An aircraft seat frame for supporting at least one human individual, the frame comprising:
   a contiguous plate having a first end and a second end;
   a first bend in the contiguous plate, the first bend spaced from the first end, thus defining a back support portion extending between the first end and the first bend;
   a second bend in the contiguous plate, the second bend spaced from the first bend, thus defining a seat portion extending between the first bend and the second bend; and
   a third bend in the contiguous plate, the third bend spaced from the second bend and from the second end, thus defining a leg portion extending between the second bend and the third bend and a base extending from the third bend to the second end.

2. The aircraft seat frame of claim 1, further comprising:
   a plurality of back support orifices extending through the back support portion;
   a plurality of leg orifices extending through the leg portion; and
   a plurality of base orifices extending through the base.

3. The aircraft seat frame of claim 2, wherein the plurality of back support orifices comprises a plurality of parallel and substantially rectangular orifices.

4. The aircraft seat frame of claim 2, wherein:
   the back support portion comprises a plurality of hourglass shaped panels; and
   the plurality of back support orifices are each substantially triangular.

5. The aircraft seat frame of claim 1, further comprising a fourth bend and a fifth bend in outer vertical edges of the back support, thus defining a pair of arm rests.

6. The aircraft seat frame of claim 1, wherein the contiguous plate comprises metal.

7. The aircraft seat frame of claim 6, wherein the metal comprises aluminum.

8. The aircraft seat frame of claim 1, wherein the contiguous plate has a thickness of about ¼ inch.

9. The aircraft seat frame of claim 1, wherein the contiguous plate has a length of about 8 to 10 feet and a width of about 4 to 6 feet.

* * * * *